(12) United States Patent
Capper et al.

(10) Patent No.: US 7,898,686 B2
(45) Date of Patent: Mar. 1, 2011

(54) SYSTEM AND METHOD FOR ENCODED RASTER DOCUMENT GENERATION

(75) Inventors: Benjamin Donald Capper, Kingston (GB); Arthur John Poirier, North Narrabeen (AU); Abhijit Mandal, Ryde (AU)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1150 days.

(21) Appl. No.: 11/539,502

(22) Filed: Oct. 6, 2006

(65) Prior Publication Data
US 2008/0084572 A1  Apr. 10, 2008

(51) Int. Cl.
G06F 3/12 (2006.01)
(52) U.S. Cl. .............. 358/1.18; 358/1.15; 358/1.16; 358/452; 358/453; 358/464
(58) Field of Classification Search ............ 358/1.9, 358/3.06, 3.07, 1.12–1.18, 452, 453, 464; 345/419, 522, 530, 543, 558, 560, 570
See application file for complete search history.

(56) References Cited

U.S. PATENT DOCUMENTS

| | | | |
|---|---|---|---|
| 5,504,843 A * | 4/1996 | Catapano et al. ........... 358/1.16 |
| 6,547,335 B2 * | 4/2003 | McSweeney ................ 298/12 |
| 6,547,355 B1 * | 4/2003 | Shimada et al. ............. 347/12 |
| 7,679,774 B2 * | 3/2010 | Petz .......................... 358/1.18 |
| 2001/0055124 A1 * | 12/2001 | Varga ........................ 358/1.15 |
| 2003/0142334 A1 * | 7/2003 | Currans et al. ............. 358/1.13 |
| 2005/0168762 A1 * | 8/2005 | Tsuchiya et al. ............ 358/1.9 |
| 2006/0268316 A1 * | 11/2006 | Condon et al. ............. 358/1.15 |

* cited by examiner

Primary Examiner—Chan S Park
(74) Attorney, Agent, or Firm—SoCal IP Law Group LLP; Steven C. Sereboff; Jonathan Pearce

(57) ABSTRACT

The subject application is directed to a system and method for encoded raster document generation. The electronic document is a suitable page description language document encoded in a page description language. Primary raster code is then generated in accordance with the received page description language. The primary raster code corresponding to the received electronic document is then stored. The primary raster code includes instructions representing dot placement in a rendering of the electronic document by an associated document output engine. Overlay data is then received corresponding to additional data associated with the electronic document. The overlay data is then converted into secondary raster code. The primary raster code and the secondary raster code are then output for generation of a bitmapped image output from a combination of the primary and the secondary raster codes.

15 Claims, 22 Drawing Sheets

SYSTEM AND METHOD FOR ENCODED RASTER DOCUMENT GENERATION

BACKGROUND OF THE INVENTION

The subject application is directed generally to rendering of documents, and more particularly to rendering of documents having a static portion and a dynamic portion, such as with forms. It will be appreciated that the subject application is applicable to any document rendering wherein two or more portions are combined electronically to form a single document output.

Electronic documents are typically generated by an application, such as a word processor, drawing package, or graphical design package. While a myriad of software applications exist, some of the more popular, currently available applications include the Microsoft Office products and products from Adobe Systems, including Adobe Acrobat. Electronic documents are frequently output in a page description language ("PDL"), which is typically formed from instructions that describe a layout of a corresponding image.

Electronic PDL documents must be decoded in order to be printed or viewed. Hard copy output, such as with a printer, will typically require a decoding of PDL into a bitmapped image during a rendering process, including raster image processing. The conversion from PDL into bitmap can require considerable processing. This can be particularly problematic when a series of documents must be output, such as when filling and generating forms.

A typical form generation operation would begin with a static form, typically in a PDL format. Supplemental content completing the form would be also accomplished by addition to or alteration of the PDL form content. Once completed, the entire PDL document needs to be converted to a bitmapped image. It will be appreciated that for many forms, such as generation of mass mailings, invoices, or any other repetitive document generation task, considerable processing time is required to convert each PDL document to bitmapped form.

An alternative to the forgoing operation is to generate and store a bitmapped image of the static form content. Supplemental information is then bitmapped, and then added as an overlay to the static form bitmap. While this operation avoids rendering of the static form content for each output, it requires substantial storage since bitmapped renderings are typically very large, especially for high resolution or multi-color documents.

It would be advantageous to have a system and method that eliminates the need to fully decode and rasterize PDL associated with static form content for each output, while also avoiding the substantial storage requirements for reusing bitmaps.

SUMMARY OF THE INVENTION

In accordance with the subject application, there is provided a system and method for encoded raster document generation.

Further, in accordance with the subject application, there is provided a system and method for rendering of documents having a static portion and a dynamic portion.

Further, in accordance with the subject application, there is provided a system and method for document rendering wherein two or more portions are combined electronically to form a single document output.

Still further, in accordance with the subject application, there is provided a system and method that eliminates the need to fully decode and rasterize PDL associated with static form content for each output, while also avoiding the substantial storage requirements for reusing bitmaps.

Still further, in accordance with the subject application, there is provided a system for encoded raster document generation. The system comprises storage means adapted for storing an electronic document as a primary raster code, which raster code includes instructions representative of dot placement in an rendering of the electronic document by an associated document output engine. The system also comprises means adapted for receiving overlay data corresponding to the electronic document and conversion means adapted for converting received overlay data to secondary raster code. The system further includes means adapted for outputting the primary raster code and the secondary raster code for generation of a bitmapped image output from a combination thereof.

In one embodiment, the system further includes means adapted for receiving an electronic page description language document encoded in a page description language. The system also includes conversion means adapted for generating the primary raster code in accordance with the received electronic page description language document and means adapted for communicating generated primary raster code to the storage means.

Preferably, the page description language is comprised of a Portable Document Format or POSTSCRIPT encoding.

In another embodiment, the system also includes decoding means adapted for decoding the primary raster code and the secondary raster code into bitmapped document image and means adapted for communicating the bitmapped document image to an associated document output engine for generation of a tangible document therefrom.

In yet another embodiment, the system further includes means adapted for appending the secondary raster code to the primary raster code so as to form a single raster code document. Preferably, the secondary raster code overwrites at least a portion of the electronic document.

Still further, in accordance with subject application, there is provided a method for encoded raster document generation in accordance with the system as set forth above.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawing and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for encoded raster document generation. In particular, the subject application is directed to a system and method for rendering of documents having a static portion and a dynamic portion. More particularly, the subject application is directed to a system and method for document rendering wherein two or more portions are combined electronically to form a single document output. Thus, the subject application is directed to a system and method that eliminates the need to fully decode and rasterize PDL associated with static form content for each output, while also avoiding the substantial storage requirements for reusing bitmaps. It will become apparent to those skilled in the art that the system and method described herein are suitably adapted to a plurality of varying electronic fields employing user interfaces, including, for example and without limitation, communications, general computing, data processing, document processing, or the like. The preferred embodiment, as depicted in FIG. 1, illustrates a document processing field for example purposes only and is not a limitation of the subject application solely to such a field.

The system of FIG. 1, which will be detailed below, facilitates several key features. These include an ability for securing a partially rendered scanline based on an ordered instruction sequence. It also includes a system for two-path rendering, such as is encountered in high level/low level rendering. Further, the system is feed forward in nature, thus allowing for an efficient rendering operation. The system of FIG. 1 provides for low-level display list rendering. It is advantageously used in connection with raster image processing ("RIP") at a low-level thereof. The system is suitably implemented at a point when a RIP engages the marking of pixels on a page. Such low-level operations include such functions as rendering a band of pixels from x to x1 at a scanline y in a specified color. Another suitable low-level operation is a rendering of a row from a glyph bit map to an x to x1 at scanline y in a specified color. Still another suitable low-level operation includes rendering a group of pseudo run length encoded ("RLE") pixels from x to x1 as scanline y in a specified color.

Figure 1:
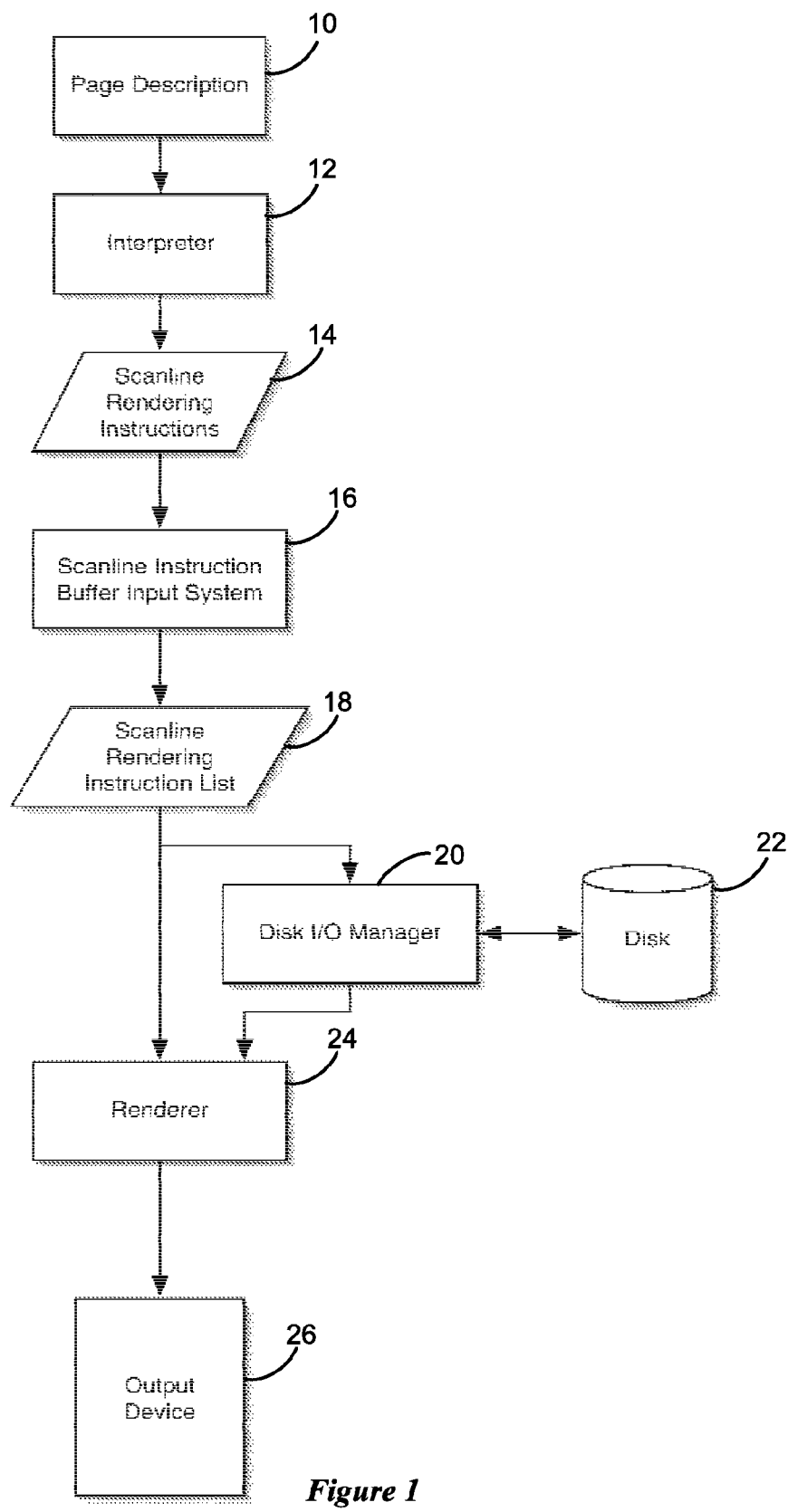
FIG. 1 is a flow chart of the overall diagram of the subject image rendering system.

In the overall system description of FIG. 1, the process commences with an input, including, for example and without limitation, an electronic document, a page description language document, text, or the like, at block 10. This input, e.g., a page description language ("PDL") document, is communicated to an interpreter at block 12. Instructions interpreted at block 12 are communicated for generation of scanline rendering instructions at block 14. These scanline instructions are then buffered at 16 and generate a scanline rendering instruction list at block 18. In accordance with one embodiment of the subject application, when a form is encountered, such as a Postscript form, as determined by the received input at block 10, the form is preferably rendered to a form cache device at block 28. It will be understood by those skilled in the art that such rendering results in the conversion of the high level operations of the PDL document being converted to low-level rendering primitives, which are stored in the form cache device at block 28. Accordingly, the forms are capable of being retrieved from the form cache device at block 28 and used to generate a scanline rendering instruction list at block 18, as illustrated in FIG. 1. The functioning of the form cache device block 28 will be explained in greater detail below. Such instructions are suitably communicated directly to a renderer at block 24, or alternatively communicated to a disk input/output manager at block 20 that works in concert with a suitable storage system 22, such as a disk or other volatile or non-volatile memory. The renderer referenced at block 24 then communicates a rendered document for output at block 26 via an output device. Suitable output devices include any dot matrix or pixel based output, such as a laser printer, ink jet printer, facsimile machine, and the like, as well as for storage of a bit map image for later rendering in any suitable memory.

Figure 2:
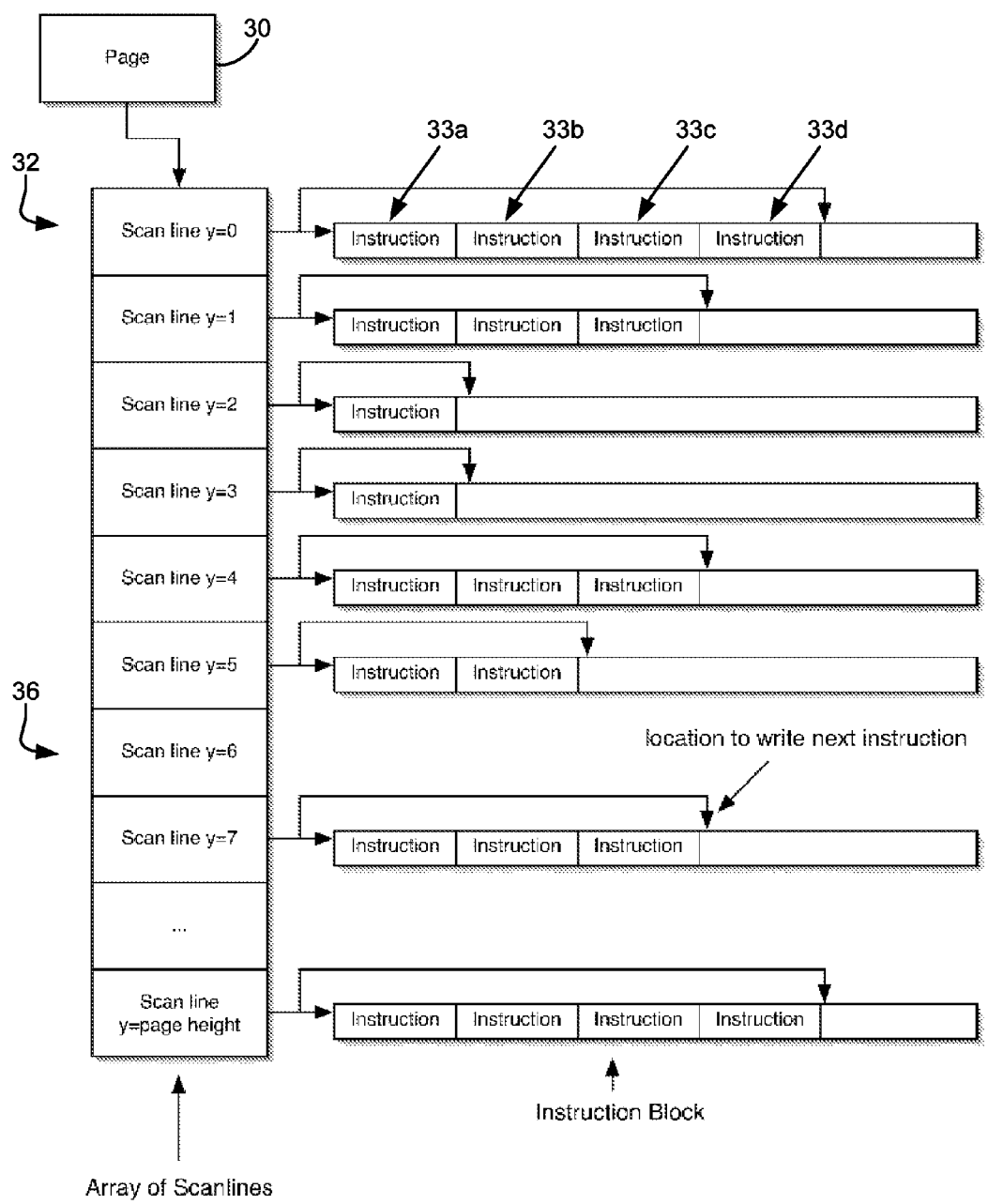
FIG. 2 illustrates organization of a page representation in connection with the subject invention.

Turning now to FIG. 2, illustrated is a page representation format as used in connection with the subject invention. As noted above, the current system advantageously uses a low-level display list. Rather than actually rendering pixels, the subject system provides for storing of rendering instructions that describe each page, as well as a method of replaying those instructions at such point and time an image is to be banded out to an output engine.

The subject system treats a page as an array of scanlines. As used herein, a scanline is a complete row of pixels on an output page. Each scanline is suitably represented by a sequence of encoded instructions that will result in a rendering of that scanline. Scanline rendering instructions are stored in one or more instruction blocks, which instruction blocks are suitably fixed-size blocks of memory, allocated from an associated memory pool.

From the illustration of FIG. 2, it will be appreciated that a page 30 is represented as a series of scanlines y=0 through y=n, wherein n is defined as a number of scanlines associated with page 30.

Turning to a representative scanline 32, it is noted that this scanline is completed at y=0 on the page 30. The scanline y=0 is represented as a series of instructions 33, a number of which corresponds to a depiction evident from the scanline 32 as will be appreciated from an understanding of the description below. In the representation of FIG. 2, such instructions correspond with scanline y=0, inclusive of instructions 33a, 33b, 33c and 33d. It will be appreciated that a similar set of instructions are associated with each scanline y for the entire page emanating from that page 30. It will be appreciated further that depending on a complexity of a content associated with the scanline, fewer or more instructions may be necessary as will be appreciated from the reading below. In addition to the foregoing, each scanline contains pointer data which functions to point to a next available area of an instruction block to which a next instruction will be added. In the preferred embodiment, each scanline also includes a graphics state which state functions to store information about a current state of specified graphics parameters associated with that scanline.

During a RIP process, instructions are added to or appended to a scanline following a previous instruction associated with a particular instruction block. In the event a scanline is empty, such as illustrated at scanline 36 where y=6 in FIG. 2, the system suitably allocates a new, empty instruction block. In the preferred embodiment, the system does not require a read from an instruction block during the encoding or translation process, only functioning to append instructions in each instance. It will be appreciated that at a point when a banding of a page is being made to an output controller, the system functions to play back instructions to render individual scanlines prior to passing them to a printer system for output therefrom.

In the preferred embodiment, memory associated with each scanline functions to store graphic state information. This state information is suitably used both during a process of adding instructions to a scanline, as well as during a final rendering process. However, it is to be appreciated that in certain situations, it may be advantageous for performance reasons to create a localized cache of selected information. Suitable information for this graphic state includes a current color associated with the scanline. A suitable default color is suitably black.

Graphic state information also suitably includes current opacity associated with a scanline. In a preferred embodiment, the default opacity is fully opaque. Graphic state information also suitably includes a current raster operator ("ROP"), such as is used in connection with a printer control language ("PCL"). Any suitable printer control language is appropriate. However, a preferred embodiment employs PCL/XL formerly known as PCL 6, as propagated by Hewlett-Packard. A suitable default ROP is 0. An additional state entry is suitably a current pattern, with a suitable default being no pattern. As will be appreciated below, the subject system teaches modification and usage of such graphic state elements.

In the subject system, a byte-code style instruction format is suitably employed. This consists of an opCode which is typically one byte. An opCode is suitably followed by one or more parameter bytes, as well as optional embedded data. Selected opCodes suitably include selected state information. Such opCode types suitably effect changes that affect all following instructions, such as opCodes that modify a scanline graphics state.

Figure 3:
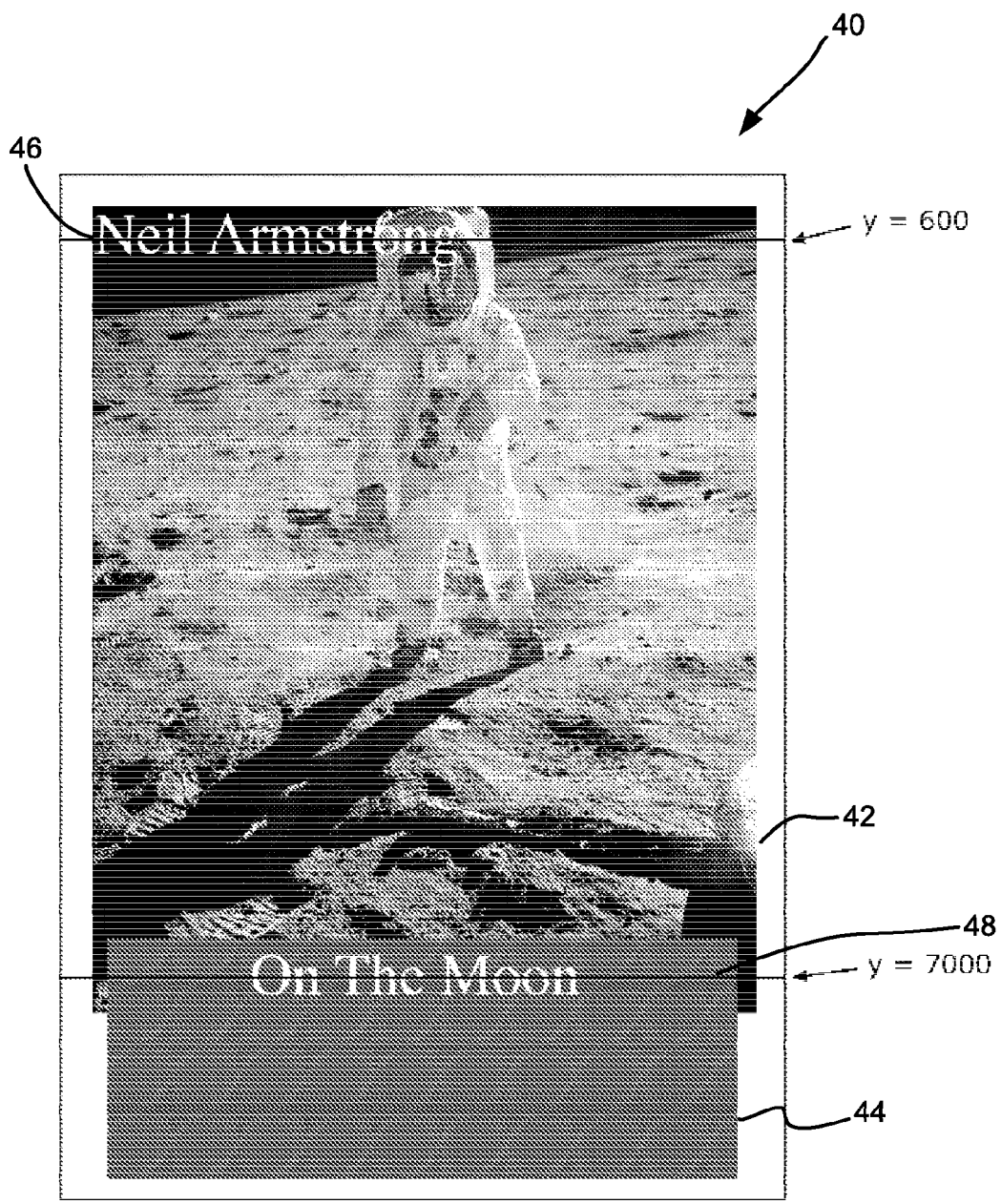
FIG. 3 illustrates a sample image for rendering in connection with the subject invention.

The subject system advantageously uses four opCodes. General band rendering is suitable for representations, such as line art. A graphic state is suitable for setting a current color, ROP, ternary ROP ("TROP"), pattern, and the like. An opCode is suitably provided for batch pixel rendering and caching. This facilitates image rendering, patterns, PostScript shading, portable document format ("PDF") shading, and the like. Additionally, opCodes are suitably provided to correspond to a text rendering. It will be appreciated that many such opCodes are available in published and updated regularly for use in connection with PDF, PCL, PostScript, and any other suitable document language. Turning now to FIG. 3, a representative rendering using the subject system will be described using a representative sample image 40. The system is commenced by initialization of disk input/output ("I/O") and memory subsystems, allocation and initialization of scanline array (including a scanline graphics state) to default or empty values. Suitable disk and memory systems will be described in more detail below. In the representative image of FIG. 3, four elements are illustrated. A first element is that of an image 42 depicting Neil Armstrong on the moon. While the image 40 of FIG. 3 is in black and white, it will be appreciated that the subject rendering functions in color, as well as black and white images. In the description herein, it is assumed that the image 42 is in gray color to facilitate a clear understanding of the subject invention. Next, the image 40 includes a vector graphics element 44, illustrated as a rectangular portion 44 positioned at a bottom of the image 40. The system also illustrates two text objects, a first object 46 being "Neil Armstrong" that is superimposed over the pictorial area 42, and the second object 48 being the words "On The Moon," rendered in white, and superimposed on the rectangular area 44.

In FIG. 3, two representative scanlines, y=600 and y=7000, have been selected for purposes of illustration. The scanline y=600 intersects both the image 42 and the text 46. The scanline y=7000 intersects the image 42, rectangle 44 and text 48. First, descriptions for each of the portions, graphic, shape and text, will be described individually.

Turning first to the image of Neil Armstrong 42, a suitable mechanism for accomplishing a description will be described. A pictorial image, such as that 42, is suitably represented in a left to right format. Cases of pure image rendering are frequently encountered during raster image processing operations. For the description herein, it is assumed that a source image is at the same resolution as that of a document output device, such as a printer. By way of an example only, such a resolution is suitably 600 dots per inch. However, it is appreciated that any resolution is suitably utilized, both for an input and output resolution level. It will also be appreciated that translation between resolutions in an input and output is contemplated, and is suitably accomplished with scaling instructions as appreciated from the subject description. Also, for purposes of illustrating the example, suitable 8-bit gray image is presented. It is to be further appreciated that any suitable palette representation such as CMY, CMY(K), RGB, or any additive or subtractive primary color set, is suitably used. As a general rule, additive primary color sets are advantageously used in active display generators such as video display devices, and subtractive color sets are advantageously used in passive displays, such as printouts.

Figure 4:
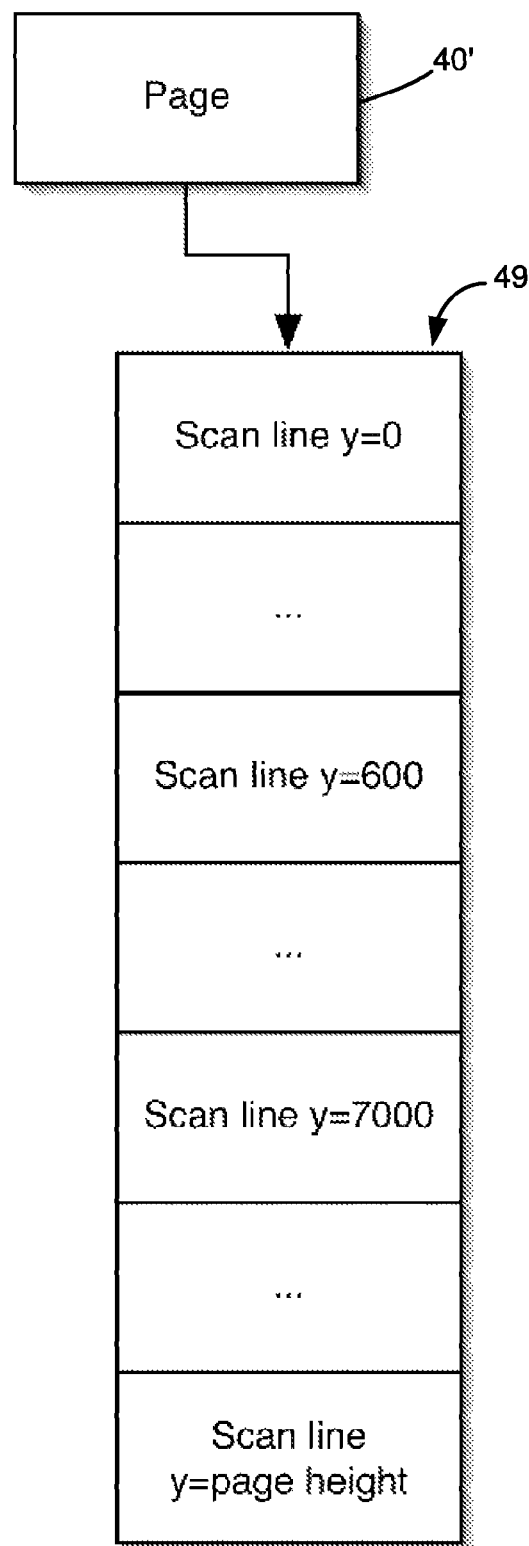
FIG. 4 illustrates a starting page representation for the rendering the sample image illustrated by FIG. 3 in connection with the subject invention.

FIG. 4, illustrated is a commencement of a building of a representation of the image of FIG. 3 which image is represented as an electronic document at 40'. Reference numeral 49 illustrates an array of scanlines each one associated with the electronic page 40' corresponding to the picture 40 illustrated in FIG. 3. At a commencement of building, a description of the image represented by the electronic page 40', no instruction blocks are allocated and all scanline structures in array 49 are set with default values.

Figure 5A:
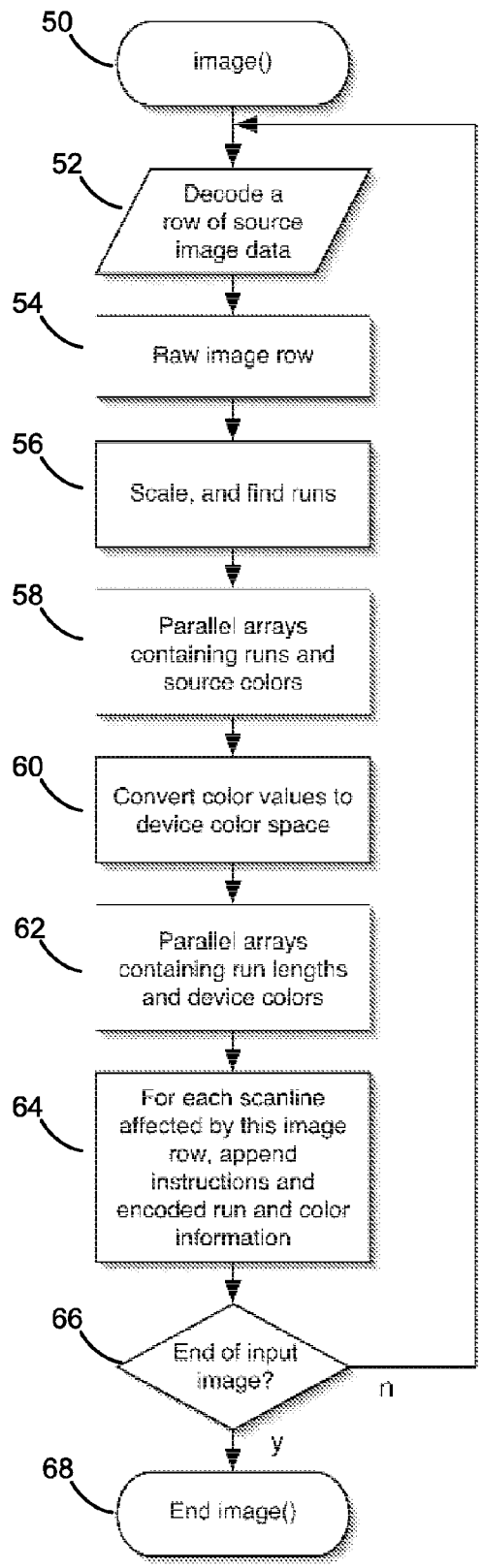
FIGS. 5A and 5B illustrate representative flowcharts for embodiments of image rendering in connection with the subject invention.

A build process for the image is detailed with additional review of the flowchart of FIG. 5A. In that flowchart, an image is received at step 50. A row of source images is decoded at step 52 to form a raw image row illustrated at step 54. Next, a scaling and determination of run length is completed at step 56. Once this is completed, progress is made to step 58, at which point a buffering is made which contains a series of input color values and pixel runs. Thereafter, a conversion is made of color values to a device specific color space associated with an output at step 60. This value is converted to a series of device color values and pixel runs at step 62. Next, at step 64, each scanline that is affected by a particular row has appended thereto instructions relative to a color and run length buffer associated therewith. Next, at step 66, determination is made as to whether each row of an image has been completed. If not, progress is returned to step 52 with a next row. Upon completion of a last row, the procedure ends at step 68.

In summary, processing for a source image, such as a representative picture, proceeds for each row of source image pixels. Scaling is completed, if needed. In the example, both an image input and output are fixed at a corresponding 600 dots per inch. Thus, in such a situation, scaling would be unnecessary. Color values and a corresponding run length are buffered. These values are converted into a color space of an associated output, such as CYMK in a typical output. The system calculates which scanlines are affected by a row being rendered. A corresponding instruction to render that source image row is appended to an instruction block associated with that scanline. This process is completed for each row.

In the representative image of FIG. 3, pictorial portion 42 affects both scanlines at y=600 and y=7000. Accordingly, during a conversion of data associated with entire image 40, at some point rendering relative to portion 42 will result with instructions being placed at these scanlines.

Figure 6A:
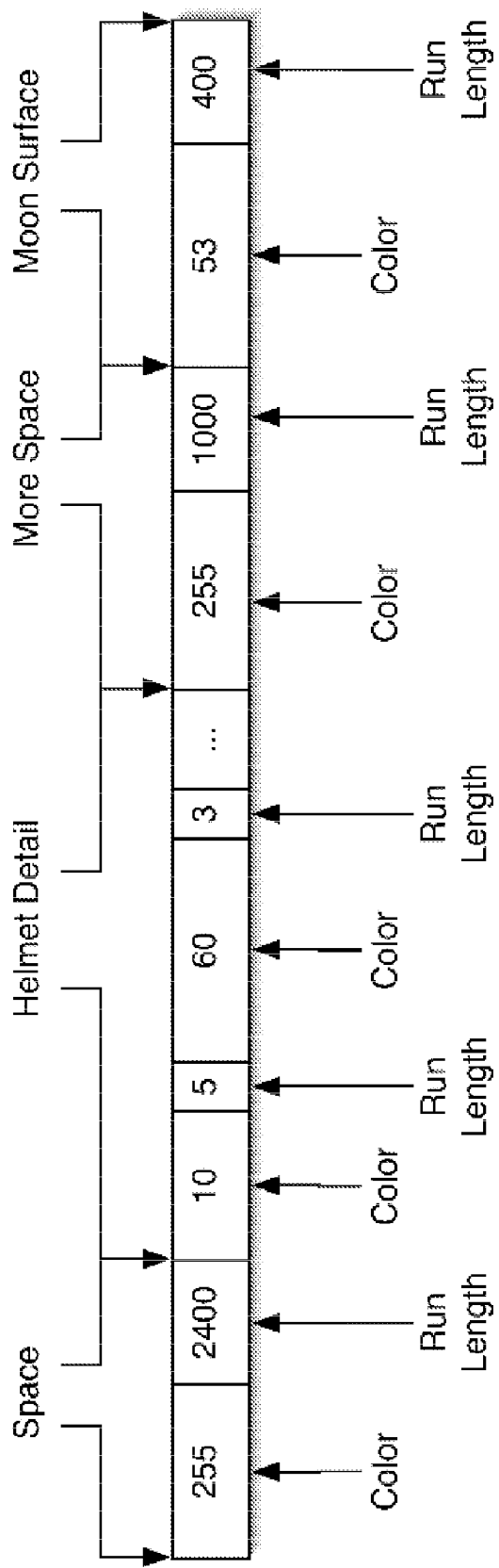
FIGS. 6A-6C illustrate representative raw pixels and run lengths of an example rendering in connection with selected embodiments of the subject invention.

Turning to representative scanline at y=600, an image will have been retrieved from a source, such as a gray image row, from an input that is to be rendered. Since both input and output are set in the example at 600 dpi, no scaling is required. A good portion of the scanline at y=600 will be black and featureless. This would be followed by some detail for the top of the helmet, followed by more black space and moon detail at the far right. Once this line is completed, a suitable representation will be generated which is depicted at FIG. 6A. While actual representation in complexity would vary this description, it is sufficient for illustration of the preferred embodiment.

Figure 7A:
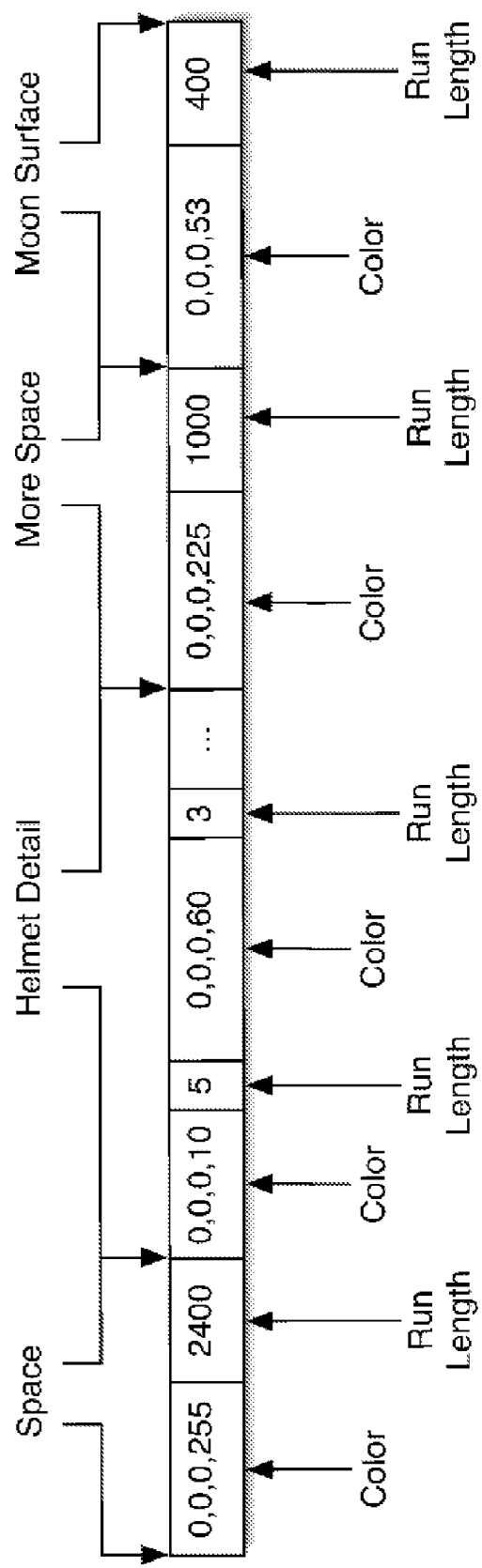
FIGS. 7A-7C illustrate CYMK pixels and run lengths of an example rendering in connection with selected embodiments the subject invention.

Next, turning to FIG. 7A, an illustration is made of a representation once a conversion is made to a color space of a suitable output device. As with FIG. 6A, this representation is provided for illustration purposes only. An actual description will vary relative to more precise details and properties of an input and output image. Information of FIG. 7A is suitably organized according to an image page, commencing at a selected coordinate corresponding to a scanline at y=600. An instruction block is allocated. This instruction block suitably includes a one byte code signifying a suitable opCode. In a first instruction block, a suitable value is representative of a beginning opCode. A next opCode is formed which sets a starting x coordinate of the image. Next, values such as that illustrated in FIG. 7A, are converted to a suitable image data encoding scheme. This process is completed for each row associated with an image until an entire image has been processed.

Figure 6B:
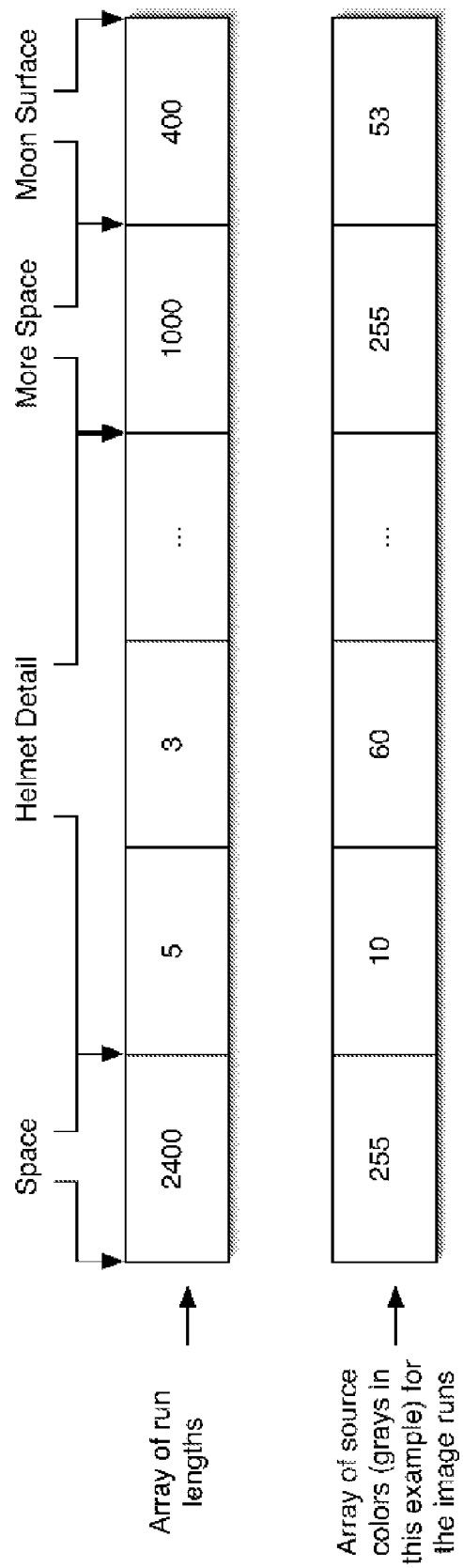
Figure 7B:
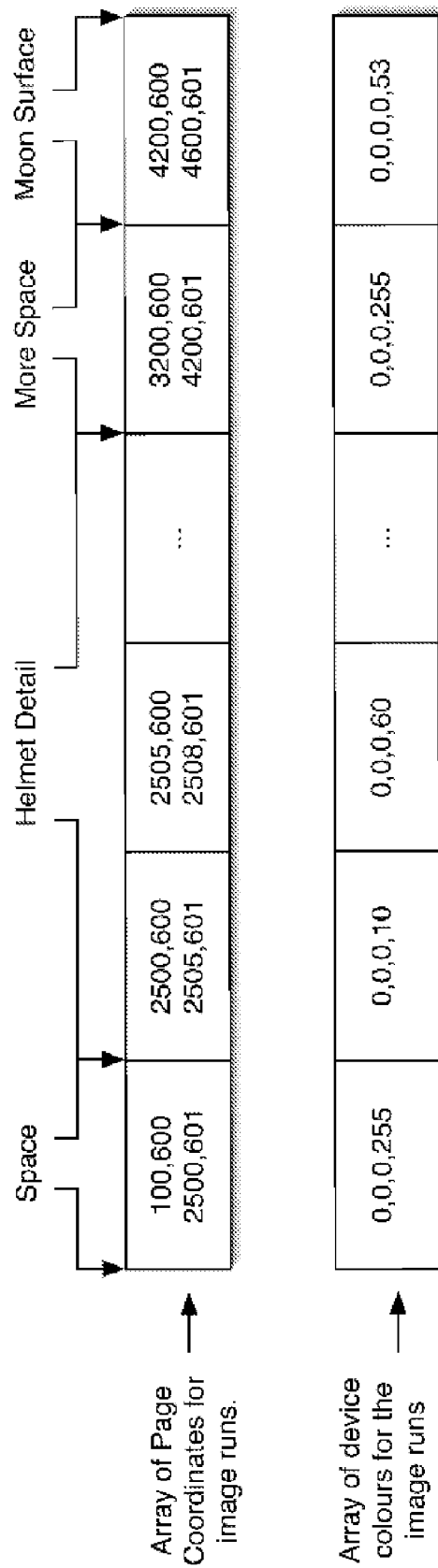

FIGS. 6B and 7B illustrate an alternative embodiment to that illustrated in connection with FIGS. 6A and 7A, above. As with FIG. 6B illustrates alternative encoding of source values in a color image and FIG. 7B illustrates alternative encoding after conversion to a color space of a suitable output device. In each, two parallel arrays are used to encode values. In both, first array is that of run lengths, and a second is an array of color values. It will be appreciated that this embodiment, page coordinate values of FIG. 7B are encoded in an array format:

$x_0, y_0$
$x_1, y_1$ defined as page coordinates of an associated image run. Thus, a first image run of a black value, suitably 255 in an 8-bit representation, is from x=100 to 2499, which is one pixel high at y=600. Values of $x_1$ and $y_1$ are non-inclusive, such that a height of a corresponding run is $y_1-y_0$ with a width of $x_1-x_0$.

Figure 6C:
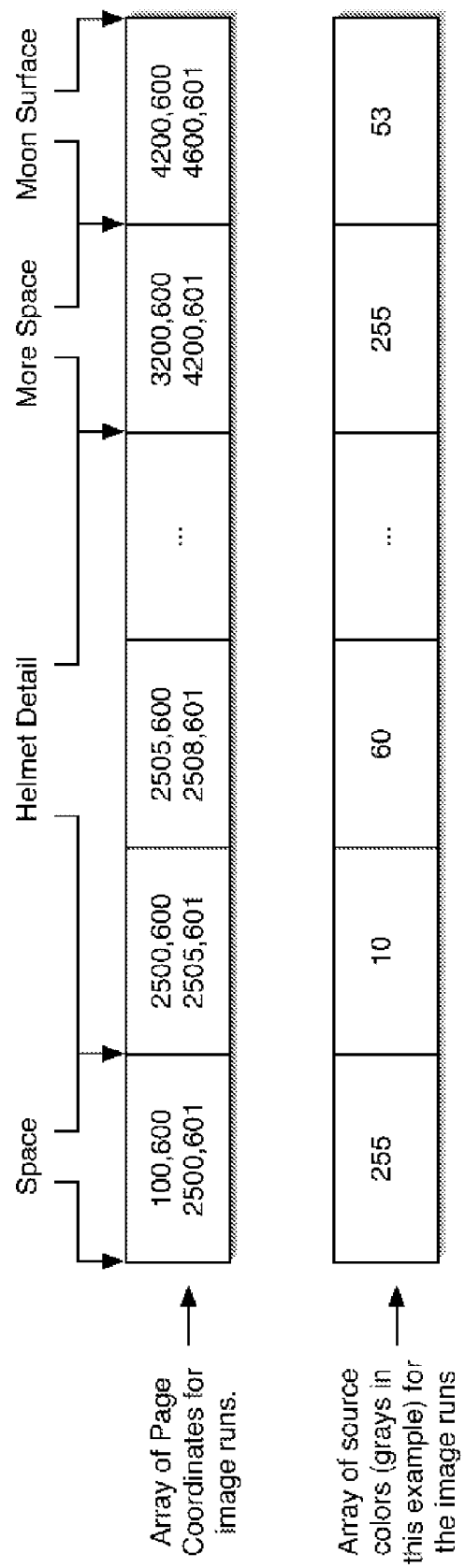
Figure 7C:
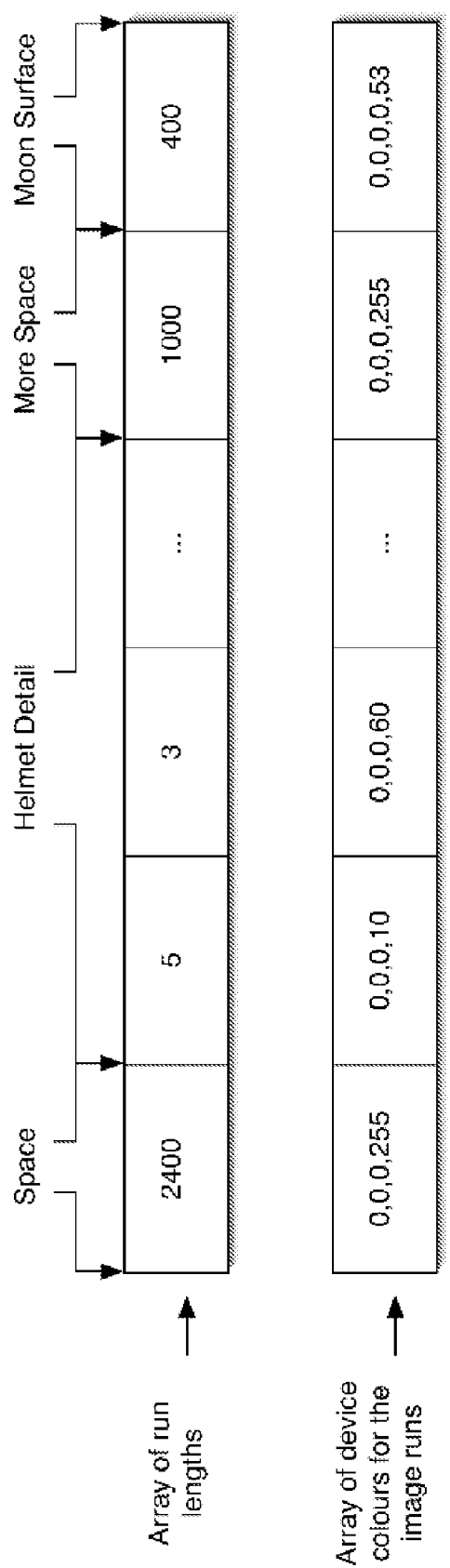

FIGS. 6C and 7C illustrate an embodiment corresponding to that of FIGS. 6B and 7B wherein a grayscale image is encoded. In this embodiment, C, Y, M values are all zero, and thus an output is considered to be in a grayscale. Thus, it will be appreciated that that all embodiments contemplate color or grayscale rendering.

Figure 5B:
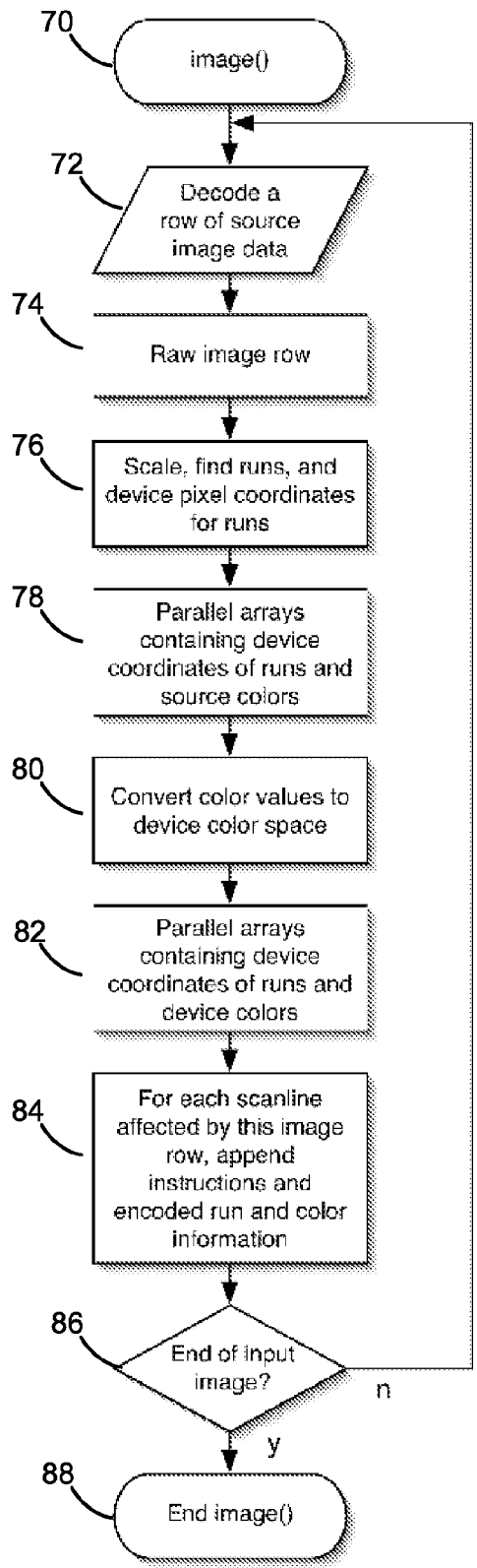

FIG. 5B illustrates a flowchart of a build process for the image in parallel array format as illustrated in connection with FIGS. 6B, 7B and 6C, 7C, above. In that flowchart, an image is received at step 70. A row of source images is decoded at step 72 to form a raw image row illustrated at step 74. Next, a scaling and determination of run length is completed at step 76. Once this is completed, progress is made to step 78, at which point a buffering is made which contains a series of input color values and pixel runs. In this embodiment, it will be noted that parallel arrays are formed. Thereafter, a conversion is made of color values to a device specific color space associated with an output at step 80. This value is buffered to a series of device color values and pixel runs, also formed as parallel arrays, at step 82. Next, at step 84, each scanline that is affected by a particular row has appended thereto instructions relative to a color and run length buffer associated therewith. Next, at step 86, determination is made as to whether each row of an image has been completed. If not, progress is returned to step 72 with a next row. Upon completion of a last row, the procedure ends at step 80.

Figure 8:
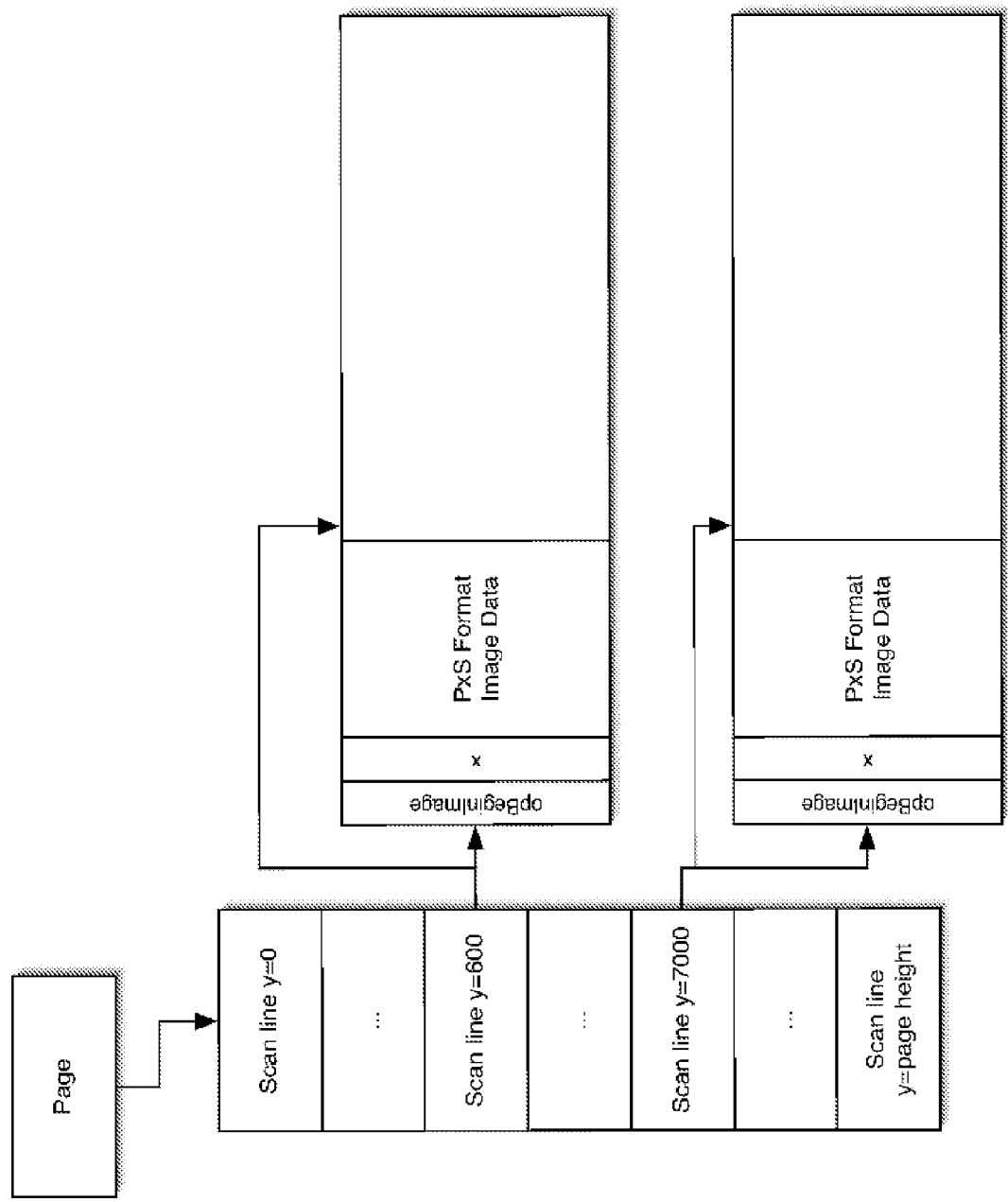
FIG. 8 illustrates a representation of a sample image in connection with the subject invention.
Figure 9:
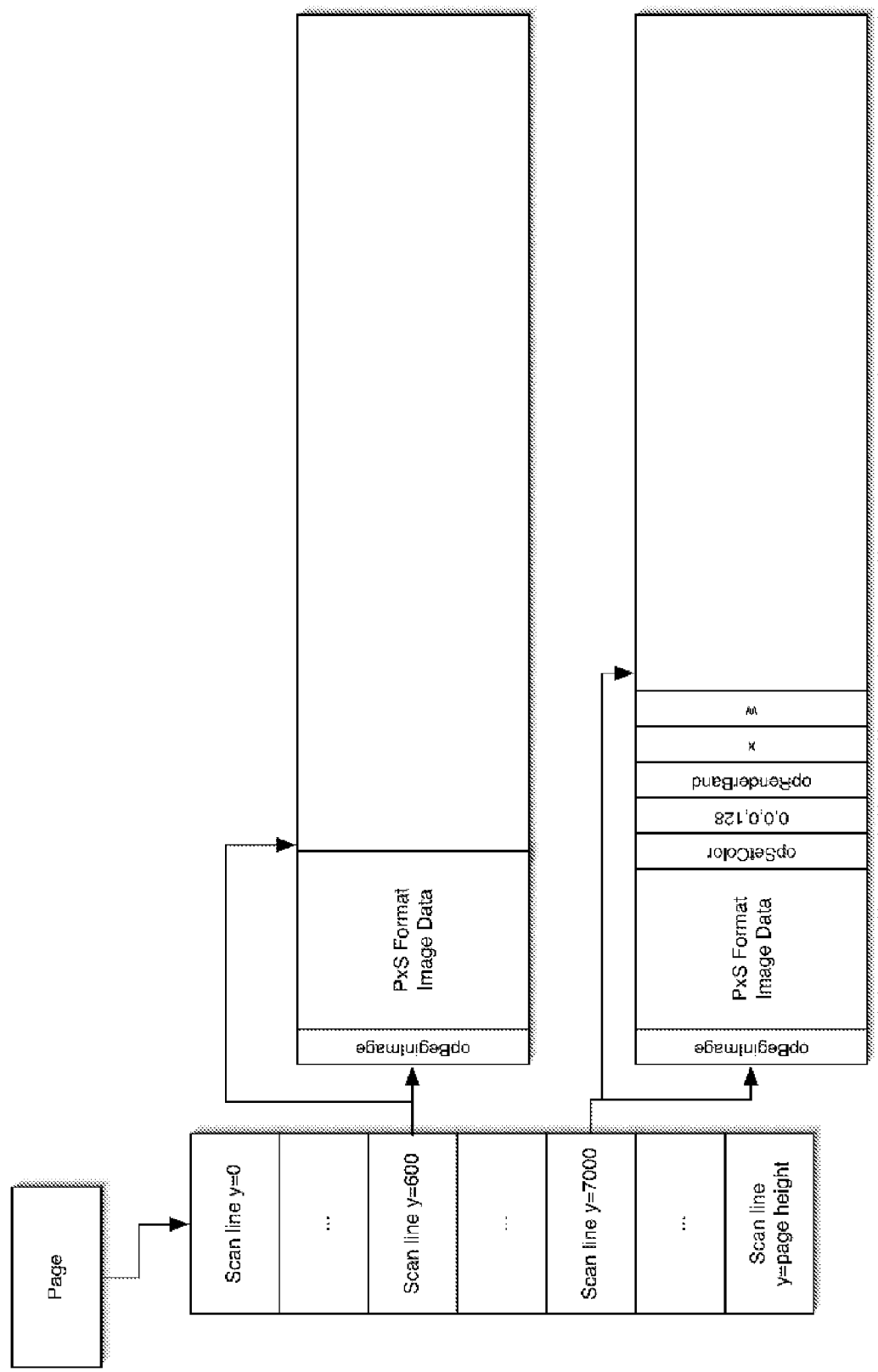
FIG. 9 illustrates a representation of another sample image in connection with the subject invention.

Turning to FIG. 8, illustrated is a portion of a complete representation inclusive of the image portion 42, as represented by locations at y=600 and y=7000. It will be appreciated that all aspects of the image 42 will have corresponding entries in the respective scanlines. Turning to FIG. 9, description will be made relative to the rectangle 44 of FIG. 3. In this example, gray rectangle 44 is suitably represented in vector form. In a suitable vector rendering, a decomposition of a shape is made into trapezoids, and then to single scanline bands. However, it is to be appreciated that in many other cases, by way of example, a complex shape will result in a series request to draw individual one pixel high bands.

Rendering of a vector rectangle is straightforward. A scan conversion will result in a request to render one band per output scanline with each band having a same starting x coordinate and width w. The subject system need not be concerned whether a rectangle overlaps with an image portion, such as that 42 described above. For composite images that include, for example, image data and vector data, vector data, such as a rectangle description, will be appended after image data and instruction block for that scanline. In the subject description, it is unnecessary to determine or specify whether a drawing appears above or below an underlying object once rendered.

In the example of rectangle 44, a conversion will eventually result in a series of requests to draw one pixel high bands. For each request, determination is made to see whether an effective scanline has an instruction block allocated to it. One is allocated if this has not yet been completed. Next, a determination is made as to whether a current color for a scanline matches that which is to be rendered. If not, appropriate opCodes are set to select a required color. Next, opCodes associated with rendering are appended to each affected line associated with a starting x coordinate and a length of the corresponding band. In the rectangle portion 44, processing will eventually lead to a scanline, such as y=7000, wherein memory has already been allocated and therefore it is unnecessary to allocate such memory again. As with the image portion 42, described above, default color is selected, such as black, and instructions will be appended as necessary to set an appropriate color. By way of example, a gray rectangle will set values suitably to 0, 0, 0, 128 which defines an 8-bit component level CYMK gray defined by 4 bytes. Continuing on scanline 7000, a byte code for an opCode to render a band, ("opRenderBand") is suitably appended to an instruction block, followed by a starting x coordinates, suitably 2 bytes and a width value w, also suitably 2 bytes.

It will be appreciated from the foregoing that the subject representation has therefore includes information both as to a picture portion 42, as well as a rectangle portion 44. Next, construction of text space elements will be described.

Figure 12:
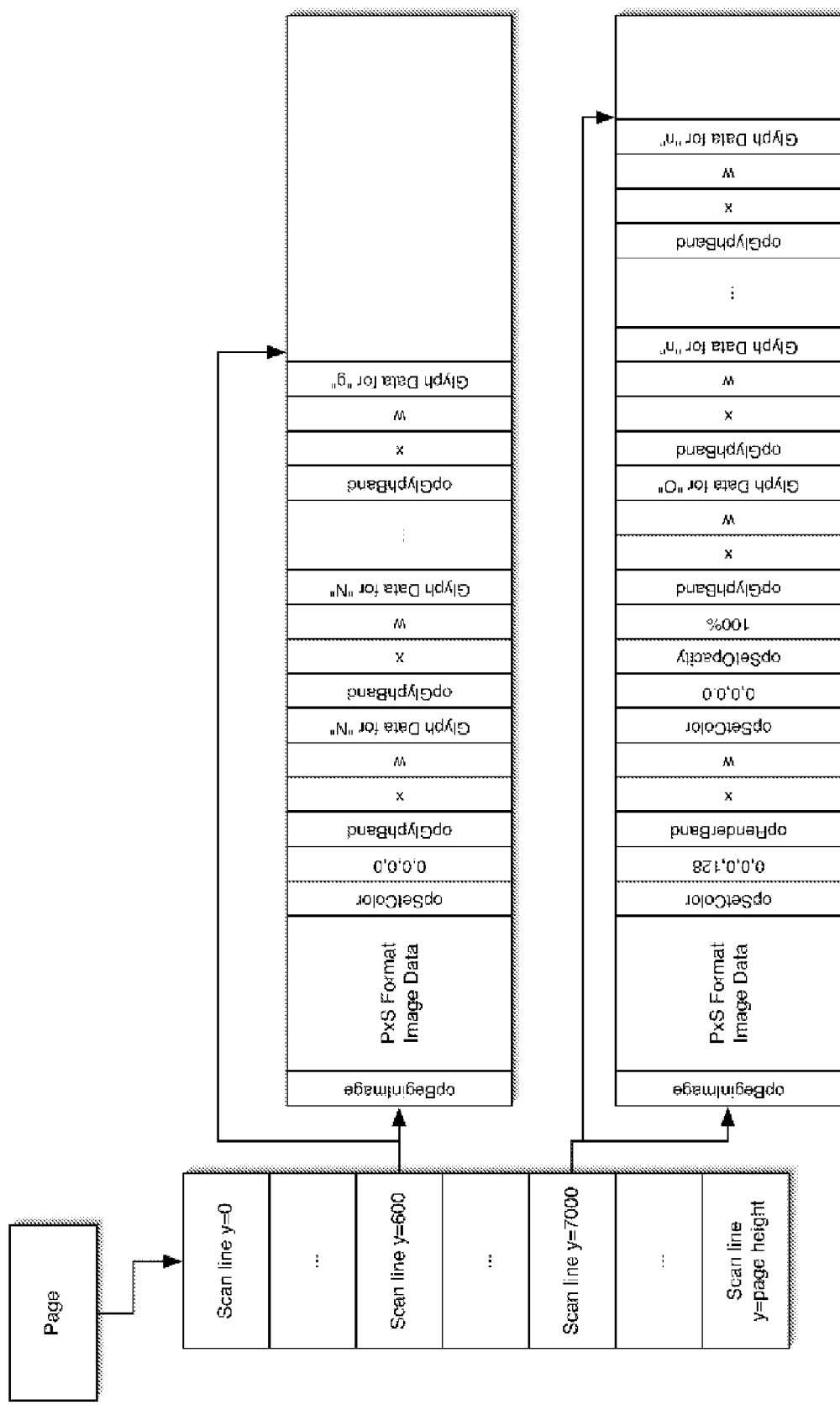
FIG. 12 illustrates a representation of text elements in connection with the subject invention.

In the sample image 40 of FIG. 3, the text aspects include those strings 46 and 48. To render text information, a request is first made to render a required character at the required size into a one bit glyph in memory. For each row in a glyph bit map, instructions are added to render that row to the appropriate output scanline in a required color. Therefore, prior to such instructions, a current color is selected if necessary. Insofar as, in the representative example, a default color for all scanlines is black, this must be set to white for the text of string 46. This suitably accomplished with an opCode, such as a one byte code as opSetColor to a selected value. By way of example in CYMK color space, 0, 0, 0, 0, suitably represents a four byte value of white. In scanline 600 of FIG. 12, a one byte code for opGlyphBand, two bytes for a next coordinate where a glyph begins, two bytes for a width of a glyph are appended.

Figure 10:
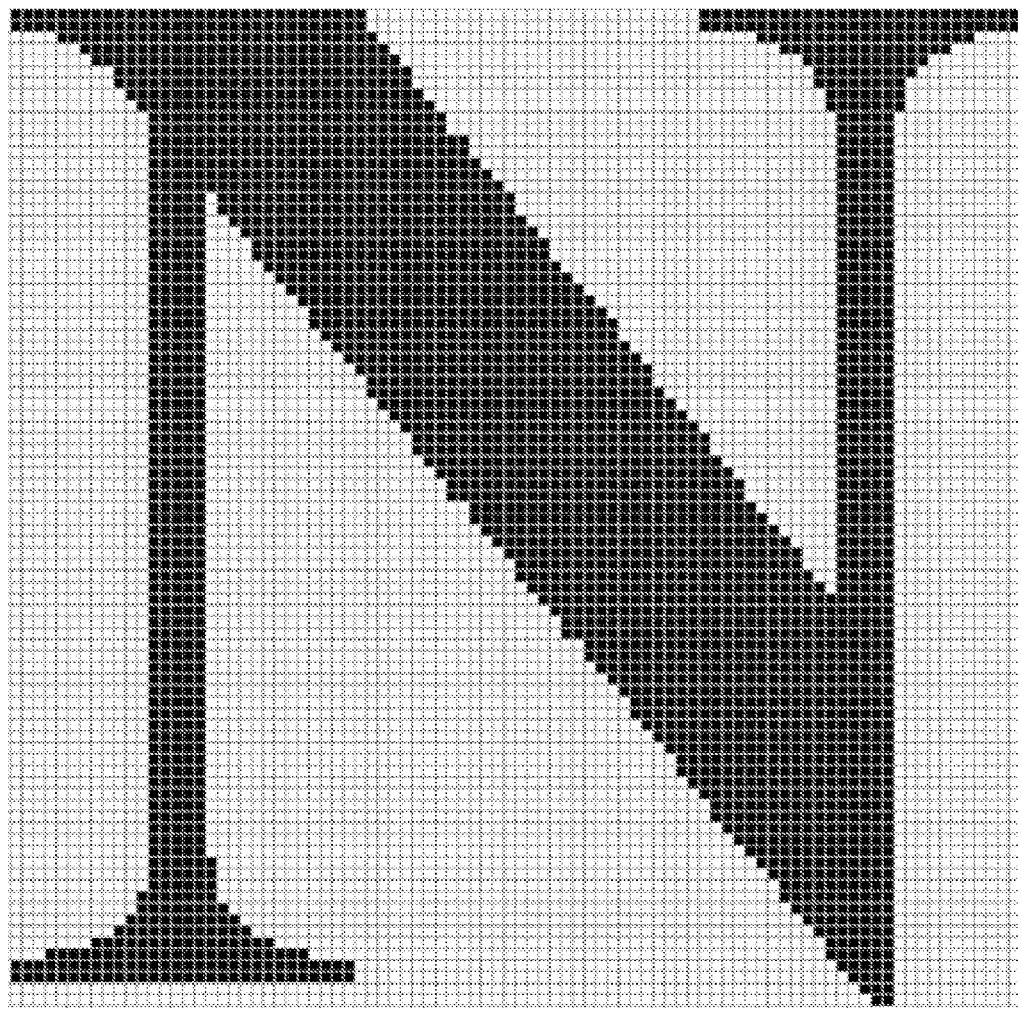
FIG. 10 illustrates a bitmap of a representative character "N" in connection with the subject invention.
Figure 11:
FIG. 11 illustrates a bit map line of the "N" character illustrated in FIG. 10.

Turning to FIG. 10, illustrated is a character "N" corresponding to first character in text string 46. FIG. 10 illustrates a suitable one bit glyph image associated with this character. At scanline 600, noted above, a portion of the "N" glyph is illustrated at FIG. 11. A single bit image, which has not been colored, parts of a bit map that are shown in black are drawn as white and white parts are suitably shown as clear. This information is then appended for each scanline to the prior representation built for the graphic and vector based images. As noted above, if an instruction block has not been allocated yet for y=600, which scanline overlaps the end, one would be allocated.

Once rendering is complete, the system has sufficient recorded information to reproduce the corresponding row of glyph data.

Remaining characters in each text string are handled as described above. It will be appreciated that subsequent letters in the same text string need not have the color set insofar as that has been done so relative to previous character, unless a next character has been chosen to have a different color to that of its predecessor.

Once a complete description for an image, including one or more image portions has been completed, the system proceeds to banding of the image to allow for output. At this stage, the system suitably provides sufficient memory for a full, uncompressed band which is typically 128 scanlines in length in current embodiments. A band is populated by finding each regular scanline that is contained within said band, and the opCode instructions associated with those scanlines.

Figure 13:
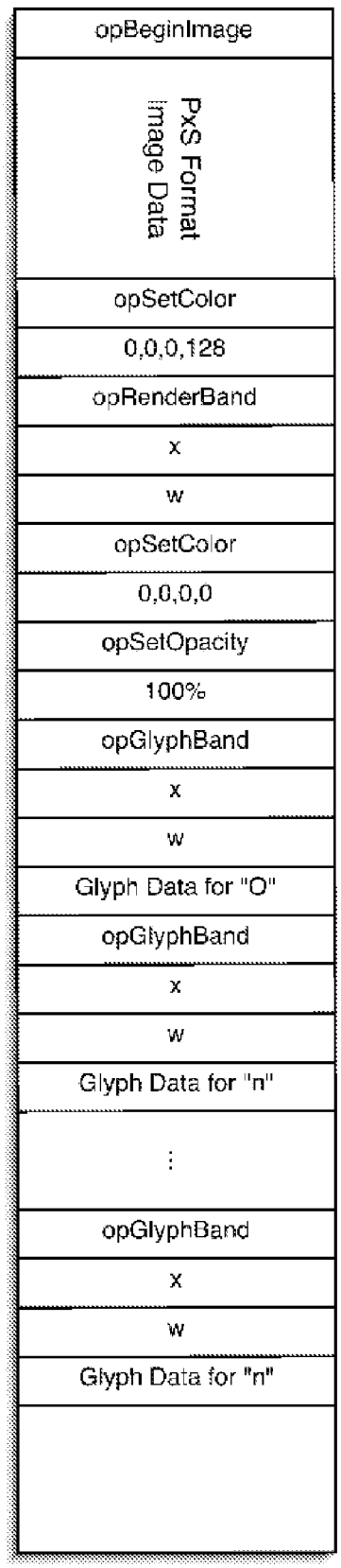
FIG. 13 illustrates a representative instruction buffer in connection with the subject invention.

FIG. 13 provides an example of instructions associated with y=7000 at the sample image, described in detail above. Illustrated in the figure is content of a suitable buffer including instructions associated with that scanline. In the rendering process, an associated engine is given a pointer to a block of memory to render the associated scanline. This is completed by processing instructions associated with that scanline. Rendering begins by first resetting a scanline graphics processor to select the defaults. Instructions are then retrieved from a corresponding block and executed so rendering is completed into a destination memory block. An example of scanline y=7000 of FIG. 13, a first opCode is retrieved initially which is the opBeginImage. This opCode suitably addresses a first two bytes which would be a starting x coordinate. Once this value is fetched, the system iterates through the encoded image data in the associated instruction buffer to plot pixels in a corresponding destination memory block.

Figure 14:
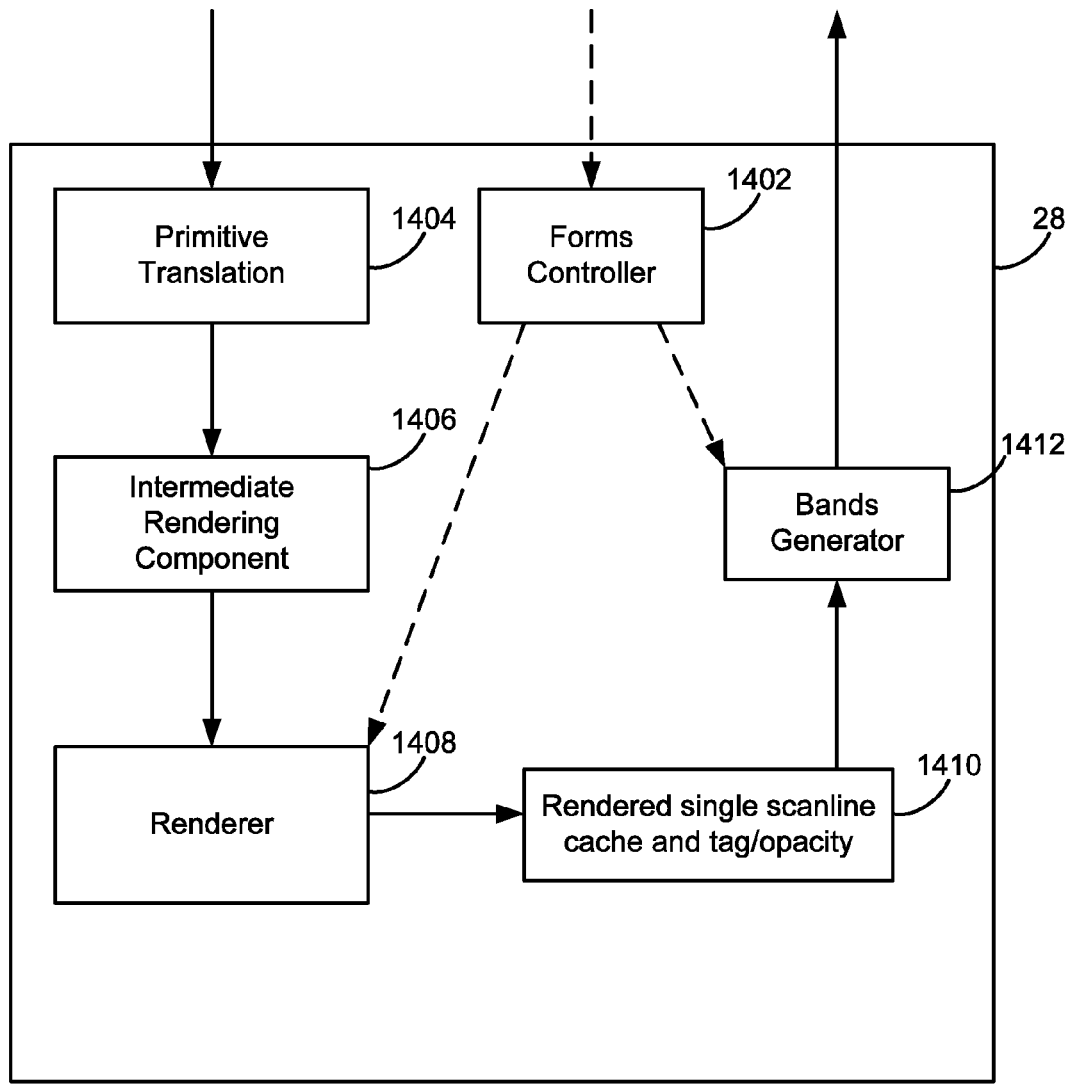
FIG. 14 is a flow chart of the overall diagram of the form cache of subject image rendering system according to the subject application.

In the illustrated example, at this point a destination memory block contains a scanline with a one pixel high slice of the moon below Neil Armstrong's feet. Next, opSetColor is then retrieved to set color. In the example, this is the 0, 0, 0, 128 value specifying a gray of the rectangle noted above. The next opCode defined is opRenderBand which retrieves a starting x coordinate and a band width, which will result in a procedure to render a band of the rectangle in gray overtop the previously rendered pictorial image. Next, an opCode is retrieved to render glyph data, which is a slice of the code "O" character, in a selected color, which is white. This rendering is communicated to the destination memory block. Lastly, rendering of text characters is completed for all remaining characters affecting that band. Once all rendering for an associated band is completed, it is ready to be printed onto a final page or otherwise output to a document output device. In the example, once rendering is completed for y=7000, progress is made to the scanline at y=7001, and so forth, until a page is fully rendered and completely passed to a system for final output Returning first to FIG. 1, with reference made hereinafter to FIG. 14, it will be apparent to those skilled in the art that the system of FIG. 1 comprises a dynamic portion and a static portion. The dynamic portion is suitably represented by blocks 10-26, while the static portion is advantageously represented by block 28. For example, the static portion is capable of representing a form while the dynamic portion represents overlay data that is to be incorporated onto the stored form. Turning now to FIG. 14, there is shown a block diagram illustrating one embodiment of a form cache device 28 in accordance with the subject application. As depicted in FIG. 14, the forms cache device 28 suitably comprises a variety of components adapted for storing one or more forms for use in a document processing operation. It will be appreciated by those skilled in the art that one or more form cache devices, corresponding to one or more forms, are capable of being implemented during operations of the subject application. Preferably, the form cache device 28, and its constituent components, are capable of implementation as hardware, software, or any suitable combination thereof. The form cache device 28 includes a forms controller 1402 suitably adapted to control operations of the form cache device 28, as will be apparent to those skilled in the art. Preferably, the forms controller 1402 manages the primitive translation, the renderer block 1408 and the bands generator block 1412.

A primitive translation block 1404 converts the low-level rendering primitives into opCodes, as set forth in greater detail above. Preferably, object tags associated with the primitives are implicit in the opCodes and are not stored as separate data. It will be appreciated by those skilled in the art that opacity values are capable of being stored in a separate channel in accordance with color representation.

The intermediate rendering component block 1406 is advantageously adapted for storage of the form data, as represented by the opCodes generated at the primitive translation block 1404. As described above with respect to FIG. 1, the subject system is advantageously implemented at a point when the RIP engages the marking of pixels on a page. Thus, when the RIP informs the forms controller block 1402 to use a cached form, the controller block 1402 invokes the renderer 1408 to render the opCodes in a scanline basis into a temporary single scanline buffer, shown as the cache block 1410 in FIG. 14. Once the scanline buffer block 1410 is full, the data in block 1410 is forwarded to the bands generator at block 1412. It will be appreciated by those skilled in the art that the opCodes have thus been turned into pixel data via the renderer block 1408. The bands generator block 1412 then concatenates the pixel data into color bands containing opacity, with associated object tag per band. The RIP consumes these bands by directing the color bands to an appropriate output device, whereupon the form is rendered to a tangible output medium. The skilled artisan will appreciate that the color bands output by the bands generator block 1412 are capable of directed to another form cache device as low-level rendering primitives to be stored in opCode representation.

It will be understood by those skilled in the art that the representation of the form cache device 28 of FIG. 14 is for example purposes only. In accordance with an alternative embodiment, the form cache device 28 is capable of comprising only scanline rendering instructions, which are then retrieved and processed further in accordance with the system of FIG. 1. Thus, the skilled artisan will appreciate that the form cache device 28, as shown in FIGS. 1 and 14, is capable of stand-alone operation, as well as operation in conjunction with a dynamic portion.

In accordance with one embodiment of the subject application, the system described above in FIG. 1 is suitably adapted to store and retrieve electronic documents from the form cache device 28. Preferably, the electronic documents are stored in an intermediate format, such as that described above with respect to FIG. 2. As the skilled artisan will appreciate, the partially rendered format, represented by FIG. 2, requires lower amounts of storage space than a corresponding bitmap format of the document. It will be understood by those skilled in the art that such a storage is advantageously suited for use in forms processing, wherein the same form is repeatedly output by an associated document output device. The electronic document is first received in the form of an electronic PDL document, which is interpreted by an interpreter, resulting in a primary raster code. This primary raster code is capable of being retrieved during subsequent document processing operations invoking the same form. The primary raster code is representative of partially rendered scanlines based on ordered instruction sequences, as explained in greater detail above.

Overlay data, such as graphical objects, which constitute new material relative to the form is received via any suitable means. For example, text to fill-in the form, additional figures below a letterhead, or the like, are representative of, but not limiting to, suitable overlay data. The overlay data is then converted into secondary raster code via the methodologies described above. In accordance with one embodiment of the subject application, the secondary raster code is appended to the primary raster code, thereby resulting in a single raster code document. As will be apparent to those skilled in the art, such an event is capable of resulting in one or more portions of the primary raster code being overwritten by the secondary raster code.

The primary raster code and the secondary raster code are then output so as to generate a bitmap image of a final document. The methodology regarding the generation of the bitmap image using the intermediate raster code is explained in greater detail above and is equally applicable to the method described herein. Thereafter, the bitmap image is forwarded to an output device for production of a tangible document thereon.

Figure 15:
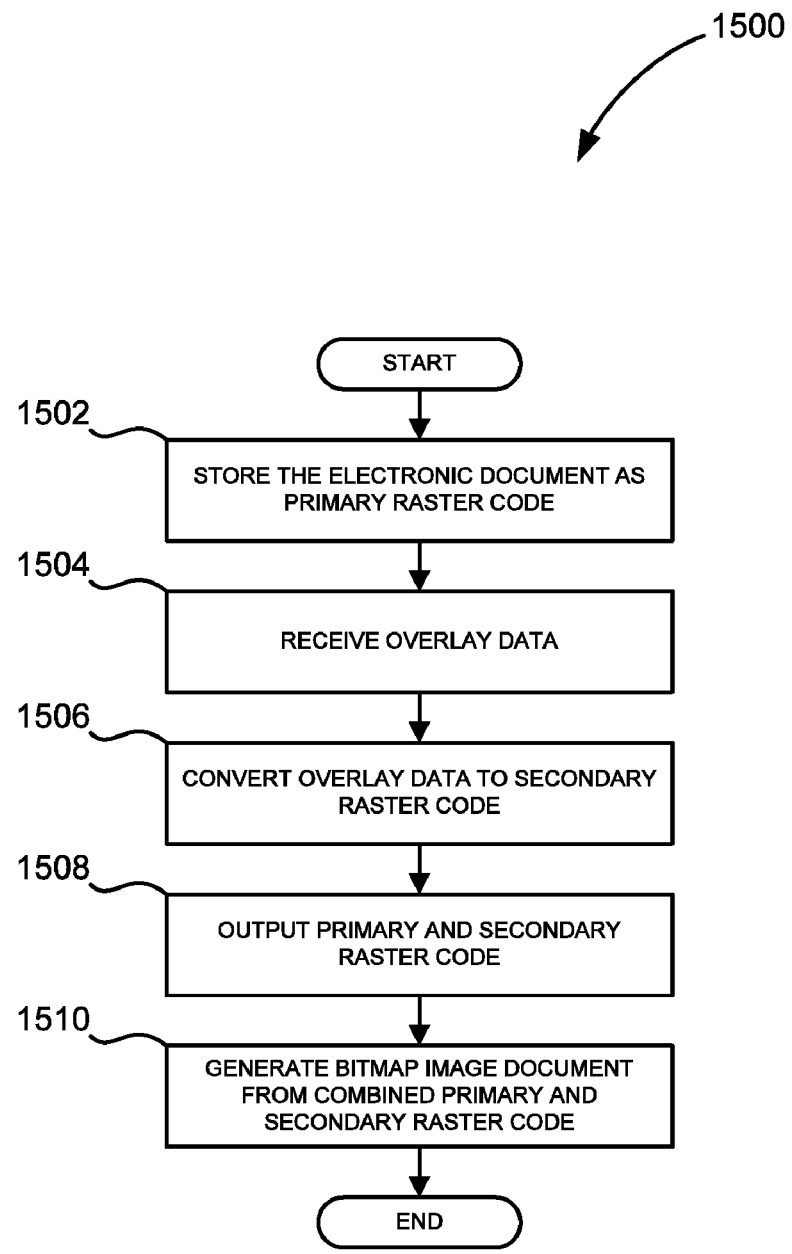
FIG. 15 is a flowchart illustrating a method for encoded raster document forming according to the subject application.

Referring now to FIG. 15, there is shown a flowchart 1500 illustrating a method for encoded raster document generation in accordance with the subject application. The method begins at step 1502 with the storage of an electronic document as primary raster code. Preferably, the primary raster code comprises instructions for each scanline of a given document, such as a form. Overlay data is then received at step 1504, which is then converted at step 1506 to secondary raster code. The primary and secondary raster code are then output at step 1508, whereupon, at step 1510, a bitmap image document is generated from the combined primary raster code and secondary raster code.

Figure 16:
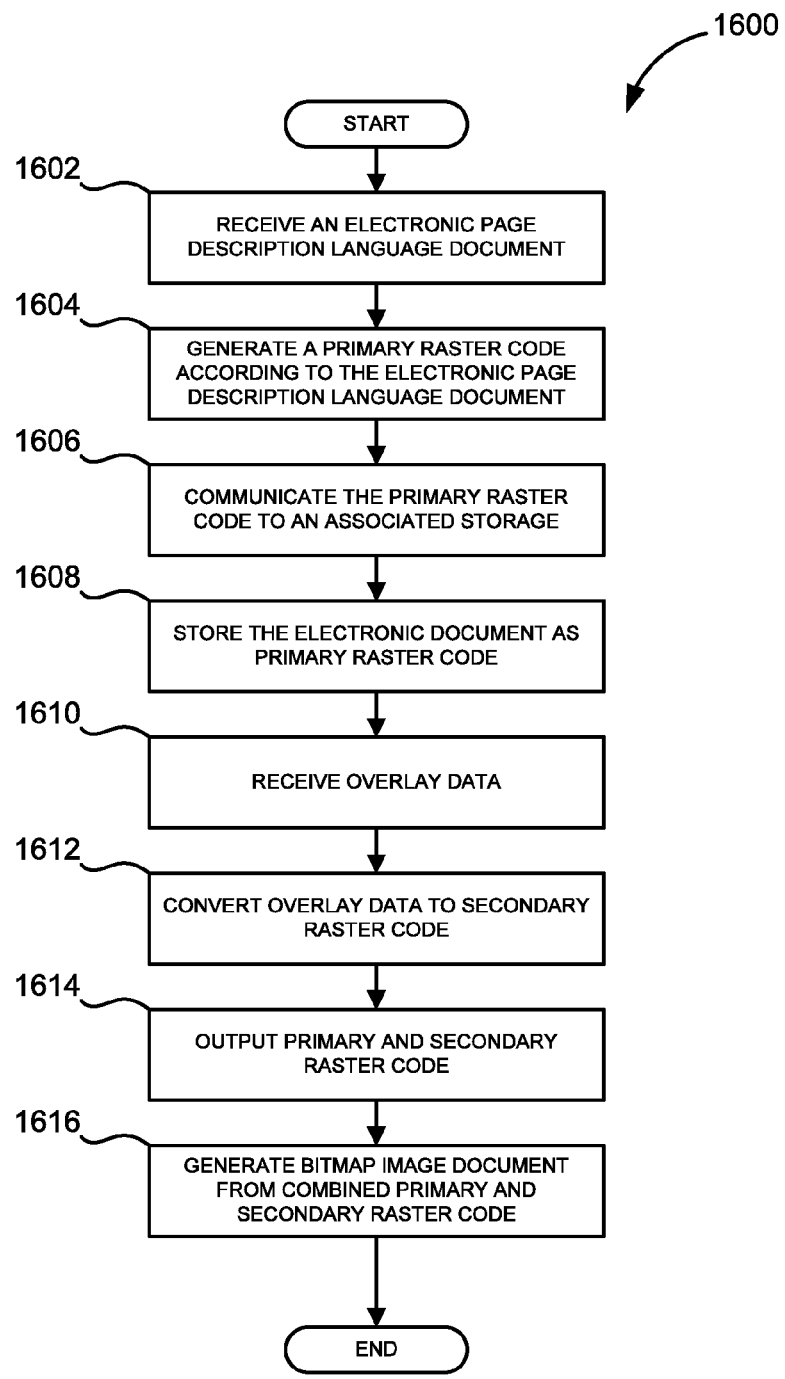
FIG. 16 is a flowchart illustrating a method for encoded raster document forming according to the subject application.

Turning now to FIG. 16, there is shown a flowchart 1600 illustrating a method for encoded raster document generation in accordance with one embodiment of the subject application. The method of FIG. 16 begins at step 1602, whereupon an electronic page description language document is received. Preferably, the page description language is in Portable Document Format or POSTSCRIPT encoding. A primary raster code is then generated, in accordance with the methodology described above in FIGS. 1-12, based upon the received electronic page description language document at step 1604. The primary raster code is then communicated, at step 1606, to an associated storage, or cache of such code. The communicated primary raster code is stored at step 1608 in the associated storage. In accordance with one embodiment of the subject application, the primary raster code corresponds to a form that is, for example, required for multiple document processing operations, such as an accounting form, a record-keeping form, letterhead, or the like.

Overlay data is then received via any suitable means known in the art at step 1610. Preferably the overlay data corresponds to additional data to be added to an existing form, such as text or graphical objects to be inserted onto a previously stored form. The overlay data is then converted at step 1612 into secondary raster code via the methodologies described above with respect to FIGS. 1-12. Thereafter, the primary raster code and the secondary raster code are output at step 1614, resulting in the generation of a bitmap image document at step 1616. Preferably, the bitmap image document is generated in accordance with the combined primary raster code and the secondary raster code.

Figure 17:
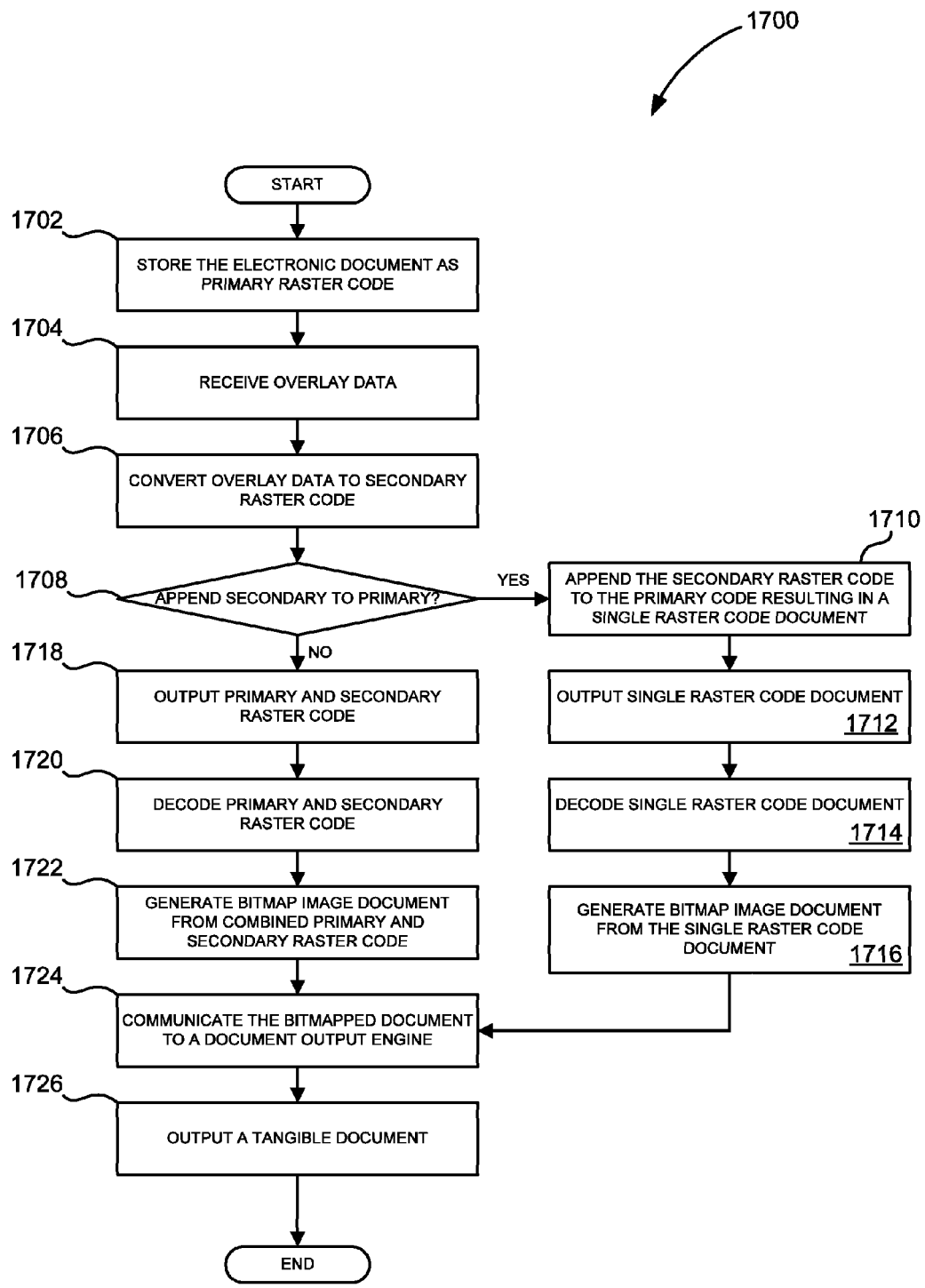
FIG. 17 is a flowchart illustrating a method for encoded raster document forming according to the subject application.

Referring now to FIG. 17, there is shown a flowchart 1700 illustrating a method for encoded raster document generation in accordance with one embodiment of the subject application. Beginning at step 1702, an electronic document is stored as primary raster code in an associated storage or cache. Preferably, the primary raster code is representative of a form, which is capable of being used for multiple document processing operations involving additional, or overlay data. The skilled artisan will appreciate that such primary raster code is preferably generated in accordance with the methodologies described in greater detail above. Overlay data is then received at step 1704 and is converted at step 1706 to secondary raster code. It will be apparent to those skilled in the art that the conversion of the overlay data into secondary raster code is advantageously accomplished via the methods described above.

A determination is then made at step 1708 whether the secondary raster code is to be appended to the primary raster code, so as to generate a single raster code document. When it is determined that the secondary raster code is to be appended to the primary raster code, flow proceeds to step 1710, whereupon the secondary raster code is appended to the primary raster code resulting in a single raster code document. It will be understood by those skilled in the art that the methodology employed by the subject application, as explained above, enables one or more portions of the secondary raster code to overwrite portions of the primary raster code. For example, as the secondary raster code are appended to the primary raster code, the instructions for each scanline, as represented in the secondary raster code, are added to the end of the instructions for the corresponding scanline of the primary raster code. The skilled artisan will appreciate that such appending results in an output document wherein each scanline is fully rendered using both the primary and the secondary raster code, in essence, filling in the form (represented by the primary raster code) with the text or graphical object overlay data (represented by the secondary raster code). This single raster code document is then output at step 1712 via any suitable means known in the art.

At step 1714, the single raster code document is decoded, whereupon a bitmap image document is generated at step 1716 in accordance with the decoded single raster code document. Flow then proceeds to step 1724, whereupon the bitmap image document is communicated to an associated document output engine. At step 1726 a tangible document is output by the associated document output engine based upon the bitmap image.

Returning to step 1708, when it is determined that the secondary raster code is not to be appended to the primary raster code, flow proceeds to step 1718, whereupon the primary and the secondary raster code are output via any suitable means. The primary raster code document and the secondary raster code document are then decoded at step 1720, resulting in the generation, at step 1722 of a bitmap image document from the combined primary raster code and the secondary raster code. The bitmap image document is then communicated to an associated document output engine at step 1724. Thereafter, the bitmapped image document is output as a tangible document at step 1726.

The subject application extends to computer programs in the form of source code, object code, code intermediate sources and partially compiled object code, or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the subject application principles as described, will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed is:

1. An encoded raster document forming system comprising:
    storage means adapted for storing an electronic document as executable primary raster code instructions, which raster code instructions include instructions representative of dot placement in an rendering of the electronic document by an associated document output engine;
    means adapted for receiving overlay data corresponding to the electronic document;
    conversion means adapted for converting received overlay data to executable secondary raster code instructions;
    means adapted for outputting the primary raster code instructions and the secondary raster code instructions for generation of a bitmapped image output from a combination thereof;
    decoding means adapted for decoding the primary raster code instructions and the secondary raster code instructions into bitmapped document image;
    means adapted for receiving an electronic page description language document encoded in a page description language;
    conversion means adapted for generating the primary raster code instructions in accordance with the received electronic page description language document; and
    means adapted for communicating the generated primary raster code instructions to the storage means.

2. The encoded raster document forming system of claim 1 further comprising:
    means adapted for communicating the bitmapped document image to an associated document output engine for generation of a tangible document therefrom.

3. The encoded raster document forming system of claim 1 further comprising means adapted for appending the secondary raster code instructions to the primary raster code instructions so as to form a single raster code document.

4. The encoded raster document forming system of claim 3 wherein the secondary raster code instructions overwrite at least a portion of the electronic document.

5. The encoded raster document forming system of claim 1 wherein the page description language is comprised of a portable document format encoding.

6. A method for encoded raster document generation comprising the steps of:
    storing, in an associated storage, an electronic document as executable primary raster code instructions, which raster code instructions include instructions representative of dot placement in a rendering of the electronic document by an associated document output engine;
    receiving overlay data corresponding to the electronic document;
    converting received overlay data to executable secondary raster code instructions;
    outputting the primary raster code instructions and the secondary raster code instructions for generation of a bitmapped image output from a combination thereof;
    decoding the primary raster code instructions and the secondary raster code instructions into bitmapped document image;

receiving an electronic page description language document encoded in a page description language;

generating the primary raster code instructions in accordance with the received electronic page description language document; and communicating the generated primary raster code instructions to the associated storage.

7. The method for encoded raster document generation of claim 6 further comprising the steps of:

communicating the bitmapped document image to an associated document output engine for generation of a tangible document therefrom.

8. The method for encoded raster document generation of claim 6 further comprising the step of appending the secondary raster code instructions to the primary raster code instructions so as to form a single raster code document.

9. The method for encoded raster document generation of claim 8 wherein the secondary raster code instructions overwrite at least a portion of the electronic document.

10. The method for encoded raster document generation of claim 6 wherein the page description language is comprised of a portable document format encoding.

11. A computer-implemented method for encoded raster document forming system comprising the steps of:

storing, in an associated storage, an electronic document as executable primary raster code instructions, which raster code includes instructions representative of dot placement in a rendering of the electronic document by an associated document output engine;

receiving overlay data corresponding to the electronic document;

converting, in a processor working in conjunction with the associated data storage, received overlay data to executable secondary raster code instructions;

outputting the primary raster code instructions and the secondary raster code instructions for generation of a bitmapped image output from a combination thereof;

decoding, via the processor, the primary raster code instructions and the secondary raster code instructions into bitmapped document image;

receiving an electronic page description language document encoded in a page description language;

generating the primary raster code instructions in accordance with the received electronic page description language document; and communicating generated primary raster code instructions to the associated storage.

12. The computer-implemented method for encoded raster document generation of claim 11 further comprising the steps of:

communicating the bitmapped document image to an associated document output engine for generation of a tangible document therefrom.

13. The computer-implemented method for encoded raster document generation of claim 11 further comprising the step of appending the secondary raster code instructions to the primary raster code instructions so as to form a single raster code document.

14. The computer-implemented method for encoded raster document generation of claim 13 wherein the secondary raster code instructions overwrite at least a portion of the electronic document.

15. The computer-implemented method for encoded raster document generation of claim 11 wherein the page description language is comprised of a portable document format encoding.

\* \* \* \* \*